United States Patent [19]
Herbert

[11] Patent Number: 6,115,267
[45] Date of Patent: Sep. 5, 2000

[54] AC-DC CONVERTER WITH NO INPUT RECTIFIERS AND POWER FACTOR CORRECTION

[76] Inventor: Edward Herbert, 1 Dyer Cemetery Rd., Canton, Conn. 06019-2029

[21] Appl. No.: 09/327,907

[22] Filed: Jun. 8, 1999

Related U.S. Application Data

[60] Provisional application No. 60/088,576, Jun. 9, 1998.

[51] Int. Cl.$^7$ .................................................. H02M 3/335
[52] U.S. Cl. .............................................. 363/25; 363/132
[58] Field of Search ................................ 363/25, 26, 16, 363/20, 21, 132, 159, 163; 323/222, 259

[56] References Cited

U.S. PATENT DOCUMENTS 3,300,708  1/1967  Rhyne, Jr. et al. ...................... 363/163

*Primary Examiner*—Peter S. Wong
*Assistant Examiner*—Rajnikant B. Patel

[57] ABSTRACT

A transformer isolated, Power Factor Corrected (PFC) AC-DC power converter comprises a main power path which is buck derived, and most of the power passes through a single power stage to the output. A parallel path in the secondary circuit shunts current to a storage capacitor during the times when the input AC current is at its peak, and returns current to the circuit when the input AC current is low. In one embodiment, the shunt stage comprises a secondary side boost converter. In another, the shunt stage comprises a buck converter. Regardless, the input stage may operate without input rectifiers if AC switches, such as back to back MOSFET's are used, because the output of the transformer and secondary rectifiers is the same regardless of the polarity of the instantaneous input voltage.

10 Claims, 7 Drawing Sheets

1st Stage, PWM

Power Factor Correction

AC-DC CONVERTER WITH NO INPUT RECTIFIERS AND POWER FACTOR CORRECTION

This application claims the benefit of U.S. Provisional Application No. 60/088,576 filed Jun. 9, 1998.

BACKGROUND OF THE INVENTION

Most AC-DC power converters use input rectifiers, often as a full wave bridge, sometimes as a voltage doubler, or as both, with switching between modes. The input rectifiers contribute significantly to losses in the converter.

Many AC-DC power converters employ power factor correction. This is often accomplished with two stages in series, a boost converter input stage and a buck converter second stage.

One embodiment of this invention teaches that the input rectifiers in an AC-DC power converter are not needed. A transformer isolated power converter with full wave rectification in the secondary is not sensitive to the polarity of the current in the primary. By using AC switches, the primary may operate with either polarity of input. Thus, the opposite polarity half cycles of commercial power can be accommodated.

It is well known to control voltage and/or current by using Pulse Width Modulation (PWM) in the input side (primary) switches. In the present invention, if the power switches in the primary circuit of a transformer are pules width modulated so that the input current is controlled to be a sine wave, or Power Factor Corrected (PFC), the full wave rectified current out of the secondary of the transformer will be a full wave rectified sine wave, with a value equal to the DC output current (neglecting losses). At the peaks of the full wave rectified sine wave, when the input current is excessive, the excess input current can be shunted to a storage capacitor so that the correct DC current is provided to the output. At the valleys of the full-wave rectified sine wave, when the input current is insufficient, the required additional current can be provided from the storage capacitor, so the correct DC current is provided to the output.

Because the losses of the input rectifier have been eliminated, and because most of the power is carried through a single stage, directly to the output, the present invention is a very efficient high PFC AC-DC converter. This configuration also has the advantage, being a buck converter, that the input current can be controlled from the time power is applied. An arbitrarily long soft start ramp can be used. There is no inrush current, a serious problem of PFC boost converters.

Most of the input power is directed to the output, with the power factor correction storage capacitors and energy control being in a parallel path. The only prior art of which I am aware that uses a parallel path is disclosed in U.S. Pat. Nos. 5,132,606 and 5,144,222, the specifications of which are included herein by reference. In these patents, a parallel path is used, but the parallel path is from the input. This invention teaches a parallel path for control and storage of energy that is entirely on the secondary side of a transformer. Thus the energy storage and the output voltage can be controlled with a secondary side controller. Only the feed back to adjust the input current scaling needs cross the isolation barrier. The referenced patents teach control methods that may be useful for the present invention, however, the present invention does not require these methods. Well known methods of power factor correction control can be adapted to this invention, and the method of control is not at the heart of this invention.

BRIEF DESCRIPTION OF THE DRAWINGS

Prior Art

Prior Art

Figure 5:
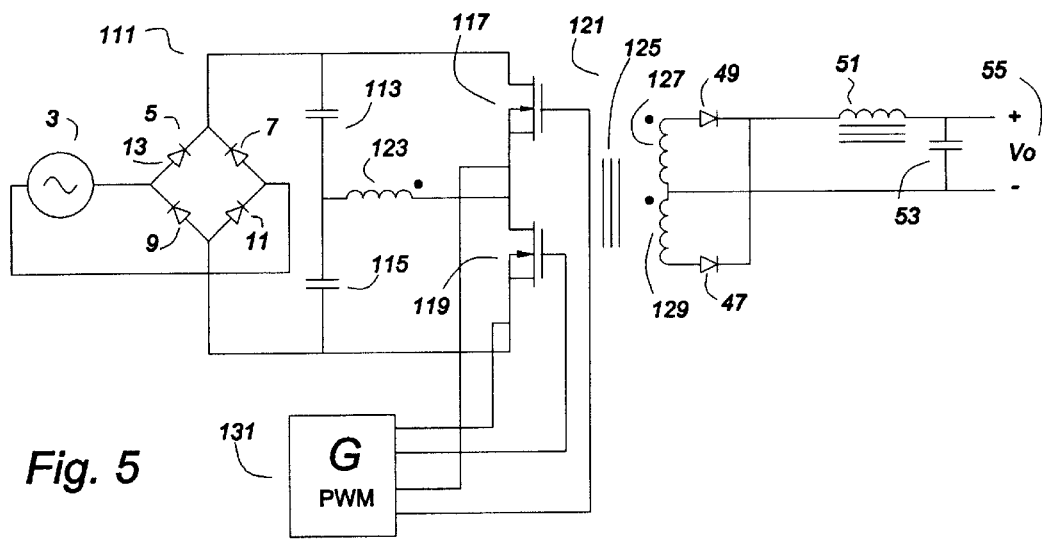

FIG. 5 shows a half bridge AC-DC converter using input rectifiers and MOSFET switches in a half bridge configuration.

Figure 6:
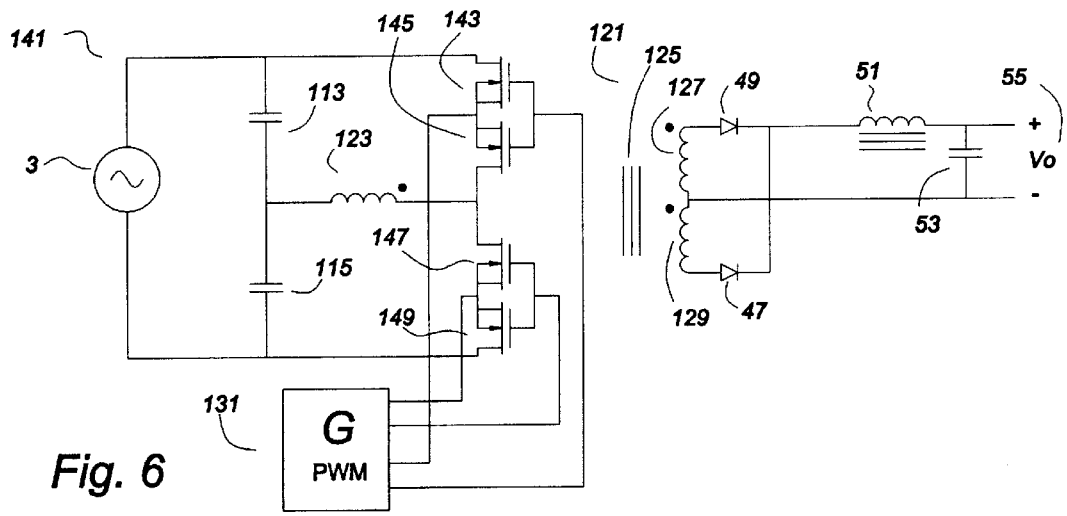

FIG. 6 shows the circuit of FIG. 5, modified by removing the input rectifiers, and using back to back MOSFET switches as AC switches.

Figure 7:
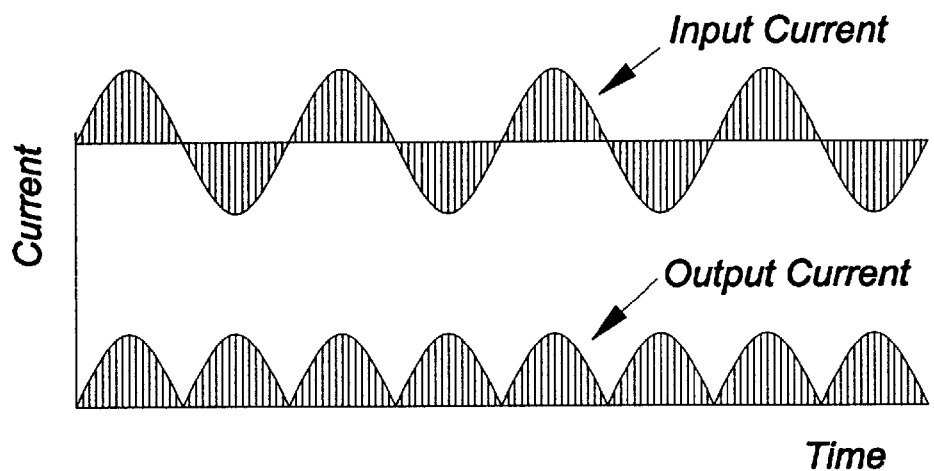

FIG. 7 shows the currents in the first stage AC-DC converters of FIGS. 2, 3, 4 or 6, (assuming additional control and energy storage circuits are added to adapt the circuits for power factor corrected (PFC) applications). The graphs represent a very large number of PWM pulses, much too small to show to scale, but the PWM pulses are suggested pictorially by a plurality of vertical lines. The first graph represents the input current, pulse width modulated for PFC, reversing polarity with each half cycle. The second graph represents the output current from the secondary full wave rectifiers, also pulse width modulated.

Figure 8:
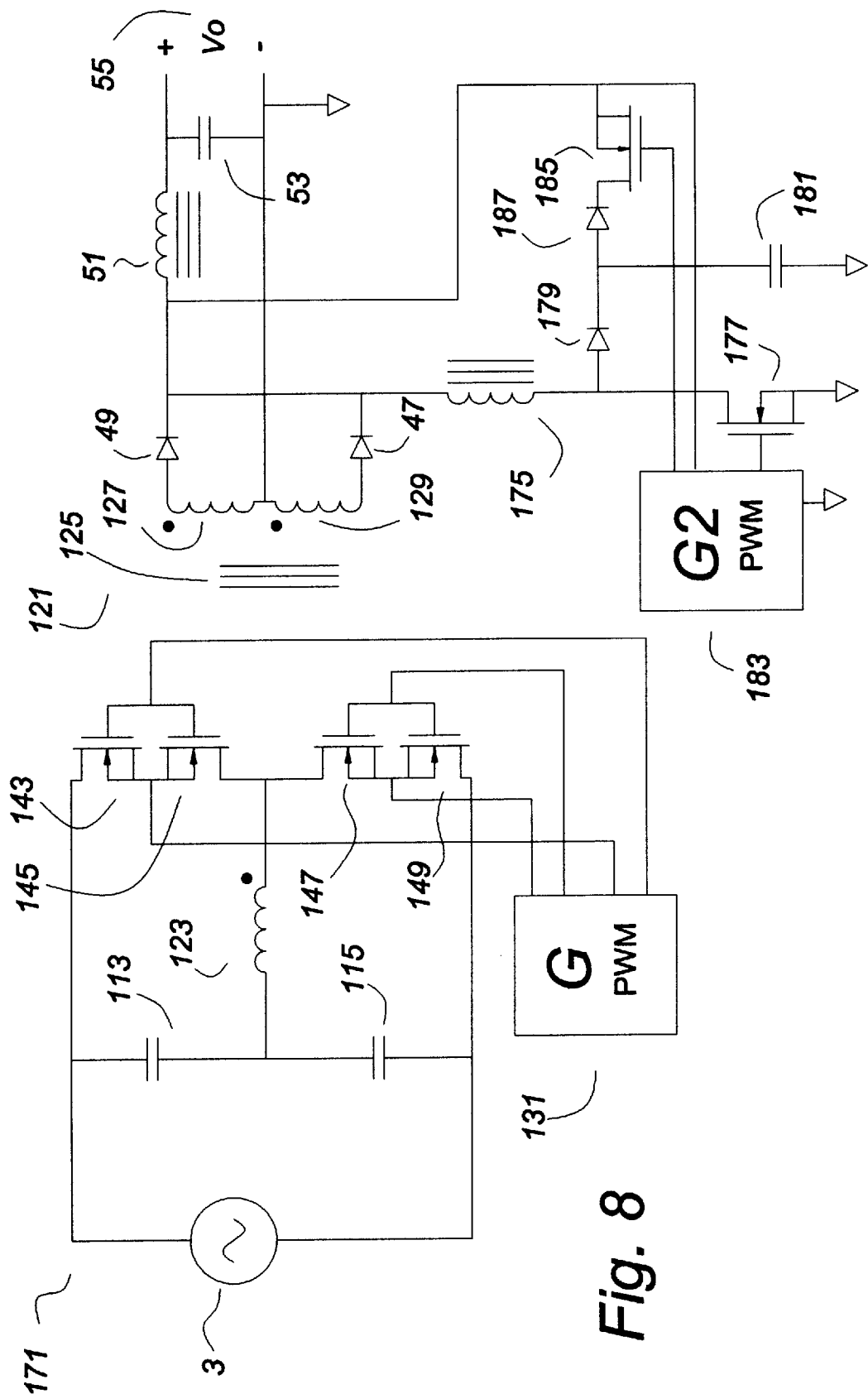

FIG. 8 shows the circuit of FIG. 6 with the addition of power factor correction (PFC) circuits.

Figure 9:
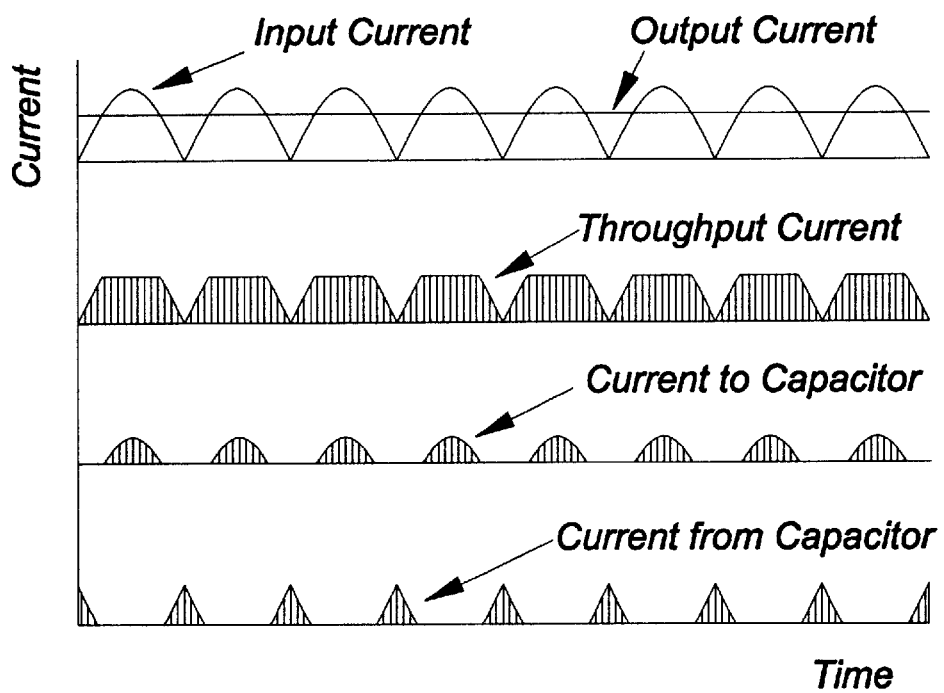

FIG. 9 shows the currents in the PFC circuits of FIG. 8. The first graph shows that the current from the secondary rectifiers (the "input" to the PFC section) is a full wave rectified sine wave (actually, a series of PWM pulses having an absolute value sine value). The desired output is a pure DC current. The second graph represents the throughput current. The third graph represents current shunted to a storage capacitor. The fourth graph represents current supplied from the storage capacitor.

Figure 10:
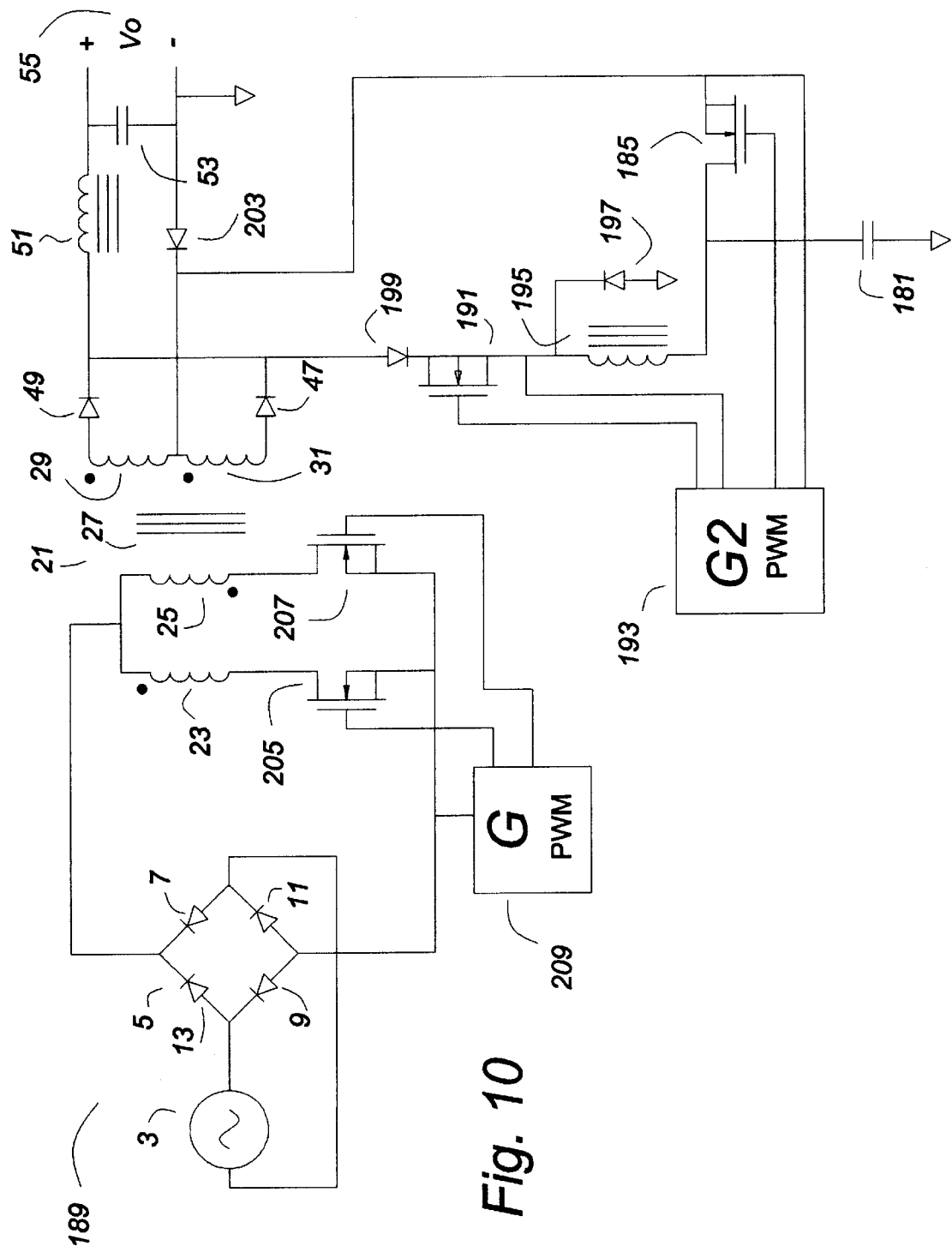

FIG. 10 shows that this invention may be used with input rectifiers. The secondary circuit of FIG. 8 is modified to show another embodiment the energy storage circuit, and the primary circuit of FIG. 1 is used with the substitution of MOSFET switches.

Figure 11:
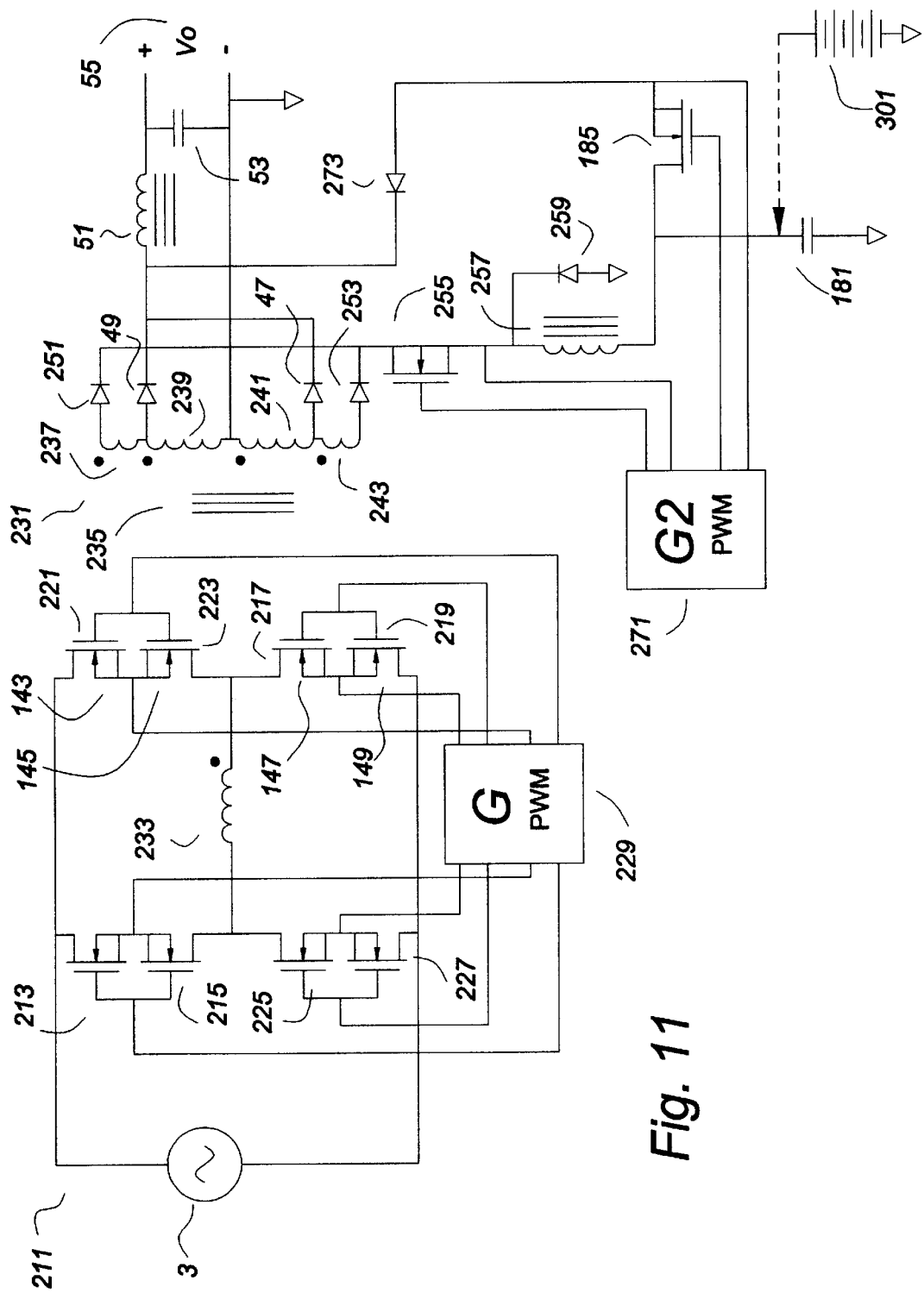

FIG. 11 shows another embodiment of the circuit of FIG. 8, and also shows an optional battery.

DESCRIPTION OF THE PREFERRED EMBODIMENT OF THE INVENTION

Figure 1:
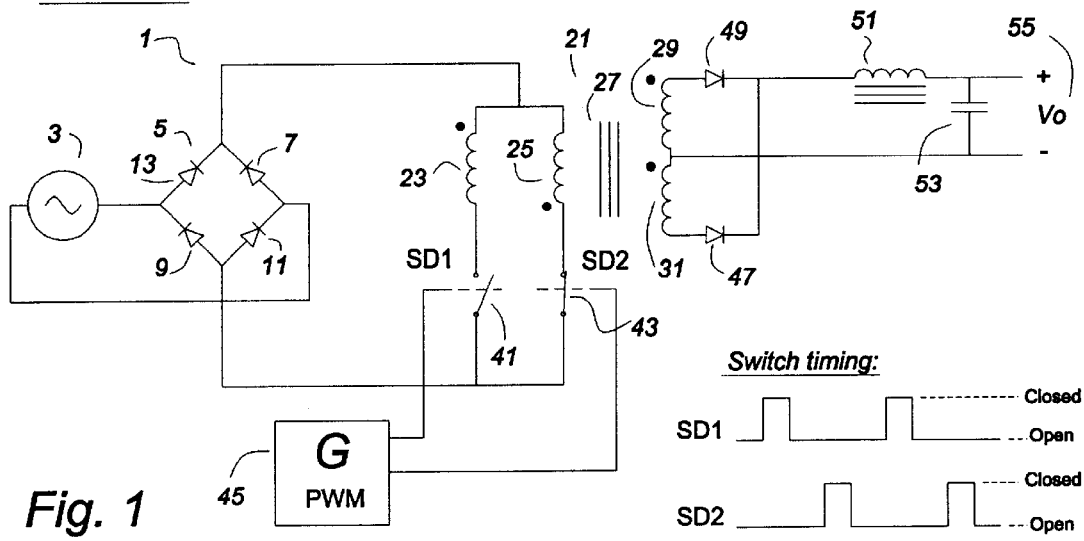
FIG. 1 shows an AC-DC converter in a push-pull configuration with a buck output stage. Switches SD1 and SD2 are "DC" switches.

FIG. 1 shows a prior art AC-DC converter 1 supplied by an AC voltage source 3, as an illustration, not a limitation. (A DC source of either polarity would work, as well, and this is to be understood wherever an AC source is recited in this specification and the claims). The output Vo 55 may be a DC output voltage, as an illustration, not a limitation. With suitable control circuits and circuit modifications, other output modes can be provided, such as constant current, variable voltage, multiple voltages, multiple isolated voltages, and so forth, as is well known in the art of power converters.

A full wave rectifier 5, comprising rectifiers 7, 9, 11 and 13 provides a rectified current to a transformer 21, comprising push pull primary windings 23 and 25, a transformer core 27 and push pull secondary windings 29 and 31. Primary switches SD1 41 and SD2 43 provide pulse width modulated alternating excitation to the primary windings 23 and 25. A PWM control circuit G 45 controls the switches 41 and 43 to control the input current and/or the output voltage. Representative timing of the switches SD1 41 and SD2 43 is shown graphically, and it is understood that the width of the pulses will vary with the operating point as a control method.

Output rectifiers 47 and 49 full wave rectify the current from the secondary windings 29 and 31 of the transformer 21. A inductor 51 and a capacitor 53 smooth the output 55 to a DC.

In showing the circuit of FIG. 1 without an input filter capacitor, its use in a Power Factor Correction (PFC) circuit is anticipated. In this case, the control G 45 would pulse width modulate the switches SD 41 and SD2 43 so as to control the input current. Though this technique is more commonly applied to a boost converter input, the methods of measuring input current and timing the pulses is well known in the art of power converters. It is not a point of novelty of this invention, therefor it is shown only as a control circuit "black box" G 45.

Sufficient elements of the circuit are shown in the figures to enable one skilled in the art of power converters to use the invention, but some details not at the point of novelty are not included so as not to clutter the drawings. For example, the skilled artisan would know that some input filtering may be necessary to prevent EMI (electromagnetic interference), and snubbers may be needed on the switches and rectifiers. Feed back and/or feed forward control circuits would be needed, probably with secondary to primary isolation. The design and use of these and other necessary ancillary components and circuits are well known to one skilled in the art of power conversion.

Figure 2:
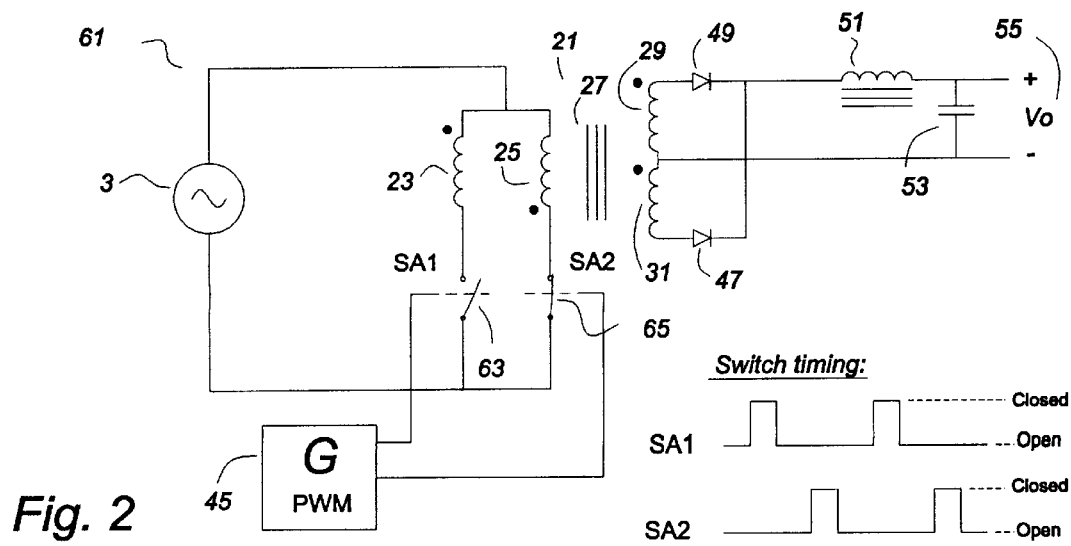
FIG. 2 shows that the same circuit can be used without the input rectifiers by using "AC" switches, SA1 and SA2.

In the AC-DC converter 61 of FIG. 2, the AC-DC converter 1 of FIG. 1 has been modified by eliminating the full wave rectifier 5, and connecting the AC voltage source 3 directly to the transformer primary windings 23 and 25 and substituting AC switches SA1 63 and SA2 65. In all other respects, the circuit is the same as the circuit of FIG. 1. In various embodiments of practical circuits the control G 45 may be different in detail, but is shown here as representing any means for opening and closing the switches SA1 63 and SA2 65 with a giving timing, and that timing is the same as it would be for the circuit of FIG. 1.

The primary drive can be used with an input voltage of either polarity because the secondary of the transformer 21 is full wave rectified. Thus, the input voltage can alternate positive and negative as in an AC voltage source with no difference in the output as compared to a circuit using a full wave rectifier. While the primary voltage and the transformer excitation will be opposite during the time that a particular switch SA1 63 or SA2 65 is closed for an opposite polarity of input voltage, the full wave rectification on the secondary accommodates this so that there is no discernible difference in the output from the rectifiers 47 and 49.

Figure 3:
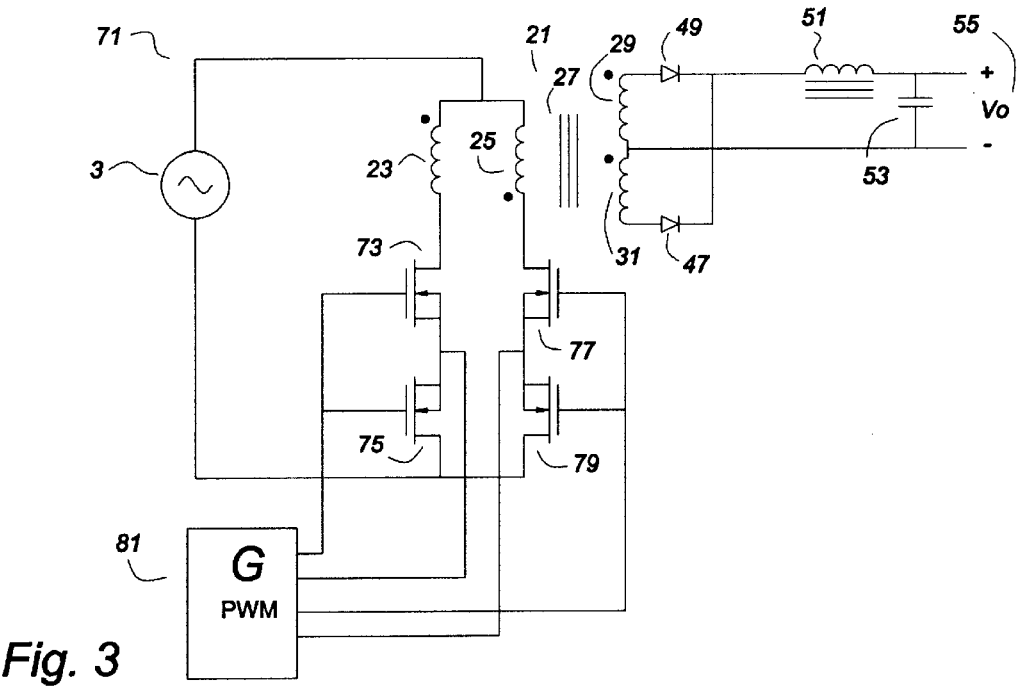
FIG. 3 shows back to back MOSFET transistors used as AC switches in the circuit of FIG. 2.

In the AC-DC converter 71 of FIG. 3, the AC switches SA1 63 and SA2 65 of FIG. 2 have been replaced by four MOSFET's 73, 75, 77 and 79. Because MOSFET's have a parallel parasitic diode, a pair must be used "back to back". Commonly, they are connected source to source, and if they are, the gates can be connected together and the MOSFET pair can be controlled with one gate drive referenced to the common source connection. A control and gate drive circuit G 81 provides that function. The control and gate drive G 81 may be, as illustrations, not limitations, of a level shifted type or of an isolated drive type. The design and use of level shifted or isolated gate drive circuits in PWM applications is well known in the art.

Figure 4:
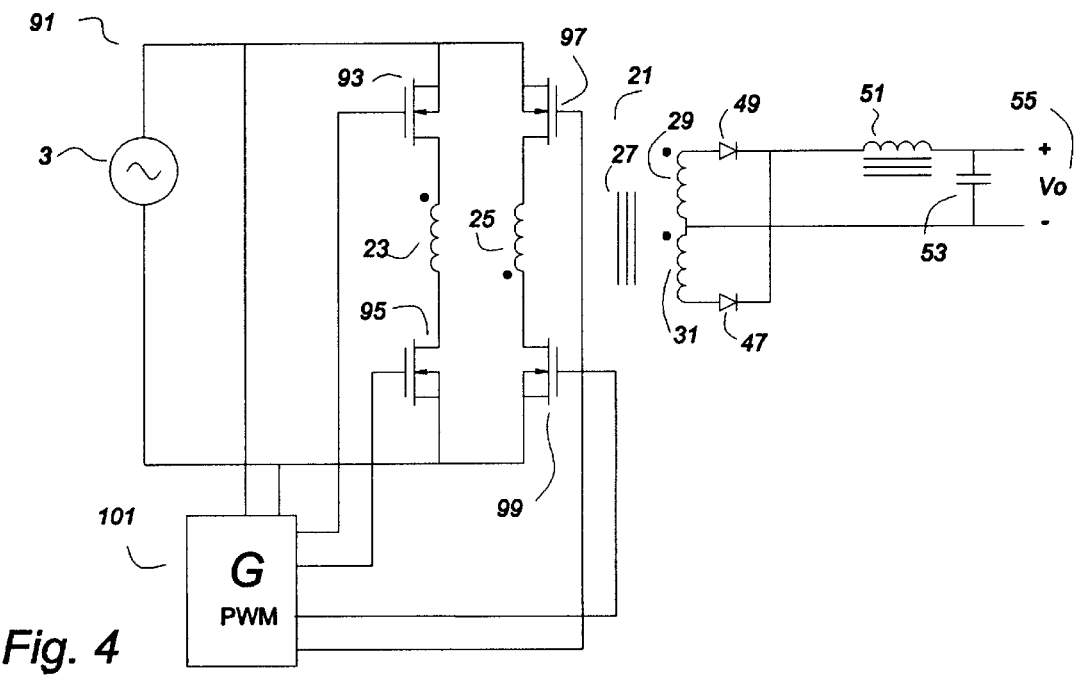
FIG. 4 shows an alternate arrangement of the circuit of FIG. 3.

The AC-DC converter 91 of FIG. 4 shows that the exact placement of the MOSFET switches 93, 95, 97 and 99 has some flexibility. A modified control and gate drive circuit G 101 would be needed, but otherwise the timing and control is the same. This arrangement may have some advantages. The sources of all four MOSFET switches 93, 95, 97 and 99 are on the power rails, so the respective MOSFET switches 93 and 97, or 95 and 99, can have the respective power rails as common references for their respective gate drive circuits. Also, by individually controlling the MOSFET switches, one pair of MOSFET switches 93 and 97, or 95 and 99 can be left "on" for entire respective half cycles of the input line frequency with opposite instantaneous polarity.

Prior art

FIG. 5 shows a familiar "half bridge" AC-DC power converter 111. An input voltage source 3 is rectified by a full wave bridge 5 comprising rectifiers 7, 9, 11 and 13. The rectified input voltage is applied to a half bridge circuit comprising two capacitors 113 and 115 and two "DC" switches shown as an illustration, not a limitation, as MOSFET switches 117 and 119. The primary 123 of a transformer 121 is across the half bridge. The MOSFET switches 117 and 119 are driven by a control and gate drive circuit G 131. Output rectifiers 47 and 49 rectify the output from the secondary windings 127 and 129 of the transformer 121. An inductor 51 and a capacitor 53 smooth the DC output 55.

The AC-DC converter 141 of FIG. 6 shows that the circuit of FIG. 5 can be modified by eliminating the full wave bridge 5 and connecting the voltage source 3 directly to the half bridge circuit if "back to back" MOSFET switches 143, 145, 147 and 149 are substituted as "AC" switches for the "DC" switches comprising MOSFET switches 117 and 119.

If the control and gate drive circuit G 131 is an isolated gate drive circuit, it can be used in the modified circuit without change. One might think that since each side now drives two MOSFET switches, 143 and 145 or 147 and 149, it would need twice the drive capacity. However, by far the largest load on the drive circuit for a MOSFET is the familiar "Miller capacitor", and this will be present in only one of the MOSFET's of each switch pair, depending on the polarity of the input AC voltage at the instant of time.

The half bridge capacitors 113 and 115 would filter the input current to some extent, but they can be quite small, as they have to provide current only for the duration of the "on" time of the high frequency PWM pulses. Because they have to reverse polarity with each half cycle, and so they do not introduce too much phase shift in the input current, they are preferably fairly small. A well designed control circuit would be able to compensate for a small phase shift.

FIG. 7 shows the current on the primary side (first curve, "Input Current") and on the secondary side, rectified (second curve, "Output Current"). The sine wave or absolute value (full wave rectified) sine wave represents the value of the current, and the vertical lines represent pictorially that it is a pulse width modulated current. The individual pulses are very small and very numerous as compared to the line frequency, so they are impossible to draw to scale. One skilled in the art of power converters would be familiar with pulse width modulated currents and voltages.

In showing a sine wave input current, the use of the circuit in a Power Factor Correcting (PFC) circuit is anticipated, and the circuits shown and discussed above must be understood to be incomplete in that they do not include the storage capacitor and ancillary components for that function. Thus, for a PFC AC-DC converter, the above circuits represent the primary power path only, through the transformer and the rectifiers. The circuits could be used as shown as an AC-DC converter (without PFC) if the load can tolerate two times line frequency ripple, or if two times line frequency ripple filtering is provided on the secondary side.

The PFC AC-DC converter 171 of FIG. 8 shows the circuit of FIG. 6 with modifications (all additions) for power factor correction. In this embodiment of the invention, a boost converter comprising an inductor 175, a MOSFET switch 177 and a rectifier 179 can divert some of the secondary current and store it as energy in an energy storage capacitor 181. This would be done at any time that the output tended too high, as sensed by the control circuit. Normally, this would occur during the peak of the AC current sine wave, when the input current is excessive. The timing and gate drive for the boost converter MOSFET switch 177 is provided by a control and gate drive circuit G2 183. A buck converter comprising a MOSFET switch 185 and the output inductor 51 can provide energy in the form of a current from the storage capacitor 181 whenever the output tended too low, as sensed by the control circuit. Normally, this would be to fill the "notch" in the full wave rectified sine wave current when the input current is insufficient. This current also charges the inductor 51 so that it will draw current from the input even when the input voltage (as reflected to the secondary) is lower than the output voltage, a necessary condition for using a buck converter for power factor correction to zero volts. A rectifier 187 may be used to prevent the storage capacitor 181 from being charged through the body diode of the MOSFET switch 185.

The MOSFET switch 185 is controlled by the control and gate drive circuit G2 183. When used for PFC, the switch timing of the input stage switches 143, 145, 147 and 149 are controlled by the control and gate drive circuit G 131 so that the input current wave form, on average, has good power factor, in the manner familiar to one skilled in the art of PFC AC-DC power converters. As is usual in PFC circuits, the feed back for the first stage control G 131 can be taken from the voltage of the storage capacitor 181. Other control methods can also be used, and the method of control is not a point of novelty in this patent application.

The output voltage is controlled by the controller G2 183. In a simple control method, whenever the output voltage tends too high, current can be shunted by the boost converter to the storage capacitor 181. This is more likely if the input current is excessive, and this is the normal condition on the peaks of the full wave rectified sine wave current. If the output voltage tends too low, energy can be taken from the storage capacitor to supplement the output current, and this is the normal condition in the valleys of the full wave rectified sine wave input. Usually, the operation of the boost converter and the buck converter would be mutually exclusive. If either is operating, adjustment to their respective duty cycle is made within their respective control bands to control the output voltage. The timing of the primary and secondary side switches may be synchronized, and it is preferred during the notch time that the secondary side MOSFET 185 conduct first, then the primary side MOSFETs (which ever is scheduled to be "on"). Even if the primary and secondary switches are "on" at the same side, conduction will occur only in the higher voltage path (as reflected to the secondary), as the rectifiers in the other path will be reversed biased.

A fuller explanation of the two input buck converter can be found in U.S. Pat. Nos. 5,132,606 and 5,144,222. These references also show some control techniques which can be used with this circuit. The present invention can be extended to three phase operation by adapting the methods shown in U.S. Pat No. 5,144,222 for three phase AC operation.

FIG. 9 shows pictorially some of the current wave forms in the circuit of FIG. 8. They are pictorial, in that the envelopes of the wave forms represent the current, and, except in the first graph, the vertical lines represent that they are pulse width modulated pulses which are impossible to draw to scale. Losses are neglected.

The first two curves, shown in the first graph of FIG. 9, shows the difference between the "Input Current" (as seen at the secondary side PFC energy control circuit) and the "Output Current", ideally a pure DC.

The next graph, "Throughput Current", shows the portion of the input current that passes straight through to the output. This is by far the larger portion of the current.

The next graph, "Current to Capacitor", shows the "excess" current that is shunted as energy to the storage capacitor 181.

The final graph, "Current from Capacitor" shows the current deficiency that is made up by taking energy from the storage capacitor 181.

The graphs of FIG. 9 apply generally to any PFC circuit, whether of the present invention or prior art. Any instantaneous power difference between the input and the output must be store in, or returned from, a storage device, usually a storage capacitor. Other storage devices could provide the same function, as illustrations, not limitations, a battery, a "super capacitor", a flywheel system, or energy storage devices not yet known, as long as they can store and return electrical energy at the required rate. All such devices are included when reference is made to a storage capacitor in this specification and the claims.

FIG. 10 shows another embodiment of this invention. There is much flexibility in the arrangement of the circuits, and some elements of the invention can be used without using all of them. In FIG. 10, the primary circuit is the primary circuit of FIG. 1 with the substitution of MOSFET switches 205 and 207, respectively, for the DC switches SD1 41 and SD2 43. The controller G 209 drives the MOSFET's 205 and 207 with proper PWM pulses to implement high PFC input current control. Note that no input filtering is shown. This does not mean that some light filtering might not be needed for EMI control, but no peak charging large input filter capacitor is used. The voltage and the current reduce to zero at null.

The secondary circuit is also changed as compared to the circuit of FIG. 8, employing a buck converter comprising a MOSFET 191 which is driven by a controller and gate drive G2 193, an inductor 195 and a catch diode 197 to charge the storage capacitor 181 during the time the input current is excessive. A rectifier 199 prevents reverse conduction through the body diode of the MOSFET 191. The rectifiers 195 and 199 could be synchronous rectifiers, given an appropriate drive, for greater efficiency. Use of buck converter at this node is possible, because the input voltage is high at the time when excessive current is to be shunted.

However, the nominal voltage on the storage capacitor is close to nominal output voltage. Thefor, the storage capacitor 181 must be quite large, to minimize its voltage excursions, and anomalous behavior may occur when the instantaneous input voltage (reflected to the secondary) is nearly equal to the output voltage. Many power factor corrected converters are used for non-critical applications, and the circuit is relatively simple.

The valley current circuit MOSFET 185, also driven by the controller and gate drive G2 193, is connected to the circuit differently as well. The source of the MOSFET 185 is connected to a rectifier 203 in the common leg of the secondary windings 29 and 31 of the transformer 21. When the MOSFET 185 is "on", the voltage of the storage capacitor 181 reverse biases the rectifier 203, and the common of the secondary windings 29 and 31 is boosted. This alternative connection makes the timing less critical, because the primary switches MOSFET's 205 and 207 and the secondary switch MOSFET 185 may conduct simultaneously. A penalty is the voltage drop, and corresponding power loss, in the rectifier 203. Whether a particular embodiment is preferred for a particular application is a subject for a trade off study, as would be well known to one skilled in the art of power converters. Various circuits are shown to demonstrate the flexibility of the application of the teachings of this invention.

FIG. 11 shows still more variations of the invention. A PFC AC-DC converter 211 comprises a full bridge primary circuit comprising eight MOSFET transistors 213 through 227 exciting the primary winding 233 of a transformer 231. The main output secondary windings 239 and 241 of the transformer 231 are rectified by rectifiers 47 and 49, providing power to the output Vo 55 through the inductor 51. An output filter capacitor 53 helps smooth the output voltage, as is well known in the art.

The transformer 231 further comprises two higher voltage secondary windings 237 and 243. As an illustration, not a limitation, the higher voltage secondary windings 237 and 243 are shown as being extra turns added to the power secondary windings 239 and 241 respectively, but they could be separate windings.

The higher voltage secondary windings 237 and 243 are rectified by rectifiers 251 and 253 to provide higher voltage current to a buck converter comprising a MOSFET 255 which is driven by a gate drive and controller G2 271, an inductor 257 and a catch diode 259. A buck converter can be used without anomalous operation because the input voltage reflected to the secondary is high during the time when the buck converter is operated.

The buck converter comprising the MOSFET 185 is the same as in FIG. 8, except the rectifier 273 of FIG. 11 is located in an alternate location to the rectifier 187 of FIG. 8. The gate drive and controller G2 271 operates the MOSFET 185.

FIG. 11 also shows a battery 211 which may be connected to the storage capacitor 181. It is possible that a battery could be connected directly to this point. The battery would have to be able to handle any ripple current that was not absorbed by the storage capacitor 181, and consideration would have to be given to the effect of charging a dead battery on the operation of the circuit as a whole. Perhaps the battery could be charged elsewhere, before attachment, or perhaps a non-storage battery could be used.

More likely some ancillary circuitry would be used at this interface, and the design and use of such circuitry would be well known by one skilled in the art of battery charging and use. The ancillary circuitry would charge the battery properly and isolate it from excessive ripple currents.

The use of a battery at this node has many advantages. Not only does it make the power supply "uninterruptible", it also allow supplementing the input power during "brown outs", taking as much power as is available from the input. As contrasted to a UPS that switches completely from the input to a battery during a "brown out", this could greatly extend battery life.

The above examples of AC-DC converters and PFC AC-DC converters are illustrations, not limitations. The teachings of this invention apply to a variety of power converter topologies, such as the full bridge or dual forward. The AC switching means can be accomplished by other switching means besides MOSFET's, by other switches or switch combinations now known or yet to be discovered. Alternative components having similar function may be substituted for the components illustrated, for example, rectifiers in the various secondary circuits shown may be replaced by properly timed MOSFET switches (synchronous rectifiers) for improved efficiency.

I claim:

1. An AC-to-DC power converter characterized by having no input rectifiers, comprising:

a source of AC power a transformer having
at least a transformer core,
at least a first primary winding and
a at least a first secondary winding, primary switching means connecting the at least a first primary winding to the source of AC power the primary switching means characterized by a capacity to conduct current of positive, negative, and alternating polarity current when "on" and a capacity to block current of positive, negative, and alternating polarity current when "off", a primary control means to control the primary switching means in a pulse width modulation mode so as to excite the primary winding of the transformer for power conversion as a buck-derived power converter, at least a first secondary rectifying means connected to the at least a first secondary winding of the transformer, the at least a first secondary rectifying means further being connected to an output filtering means, and an output means connected to the output filtering means for providing power to an external load, whereby an input power of positive, negative and alternating polarity may be converted to a controlled DC output power.

2. The AC-to-DC power converter of claim 1 wherein the primary control means controls the primary switching means for power factor correction.

3. The Ac-to Dc power converter of claim 2 further comprising:

a storage capacitor a first secondary power modulating means connecting the at least a first secondary rectifying means to the storage capacitor a second secondary power modulating means connecting the storage capacitor to the output filtering means and a secondary control means for operating the first and second secondary modulating means in a pulse width modulated mode, such that if a current from the at least a first secondary rectifying means is too great, excess current from the at least a first secondary rectifying means diverted by the first secondary modulating means for storage as energy in the storage capacitor, and if the current from the at least a first secondary rectifying means is too small, supplemental current is taken as energy from the storage capacitor to the output filtering means.

4. The AC to DC power converter of claim 3, wherein the first secondary modulation means is a boost converter comprising a boost inductor, a boost converter switching means and a boost rectifier.

5. The AC to DC power converter of claim 3, wherein the first secondary modulation means is a buck converter comprising a buck converter switching means, a catch rectifier and a buck inductor.

6. The AC to DC power converter of claim 5 further comprising a second secondary winding having a higher voltage output than the at least a first secondary winding, and a second secondary rectifying means connecting the second secondary winding to the first secondary modulating means.

7. An AC-to-DC power converter having power factor correction, characterized as having a buck derived main power path, and a secondary parallel power path for storing and returning energy in a storage capacitor, comprising:

a source of AC power a full wave rectifier connected to the source of AC power a transformer having
 at least a transformer core,
 at least a first primary winding and
 a at least a first secondary winding, primary switching means connecting the at least a first primary winding to the full wave rectifier a primary control means to control the primary switching means in a pulse width modulation mode so as to excite the primary winding of the transformer for power conversion as a buck-derived power converter with power factor correction, at least a first secondary rectifying means connected to the at least a first secondary winding of the transformer, the at least a first secondary rectifying means further being connected to an output filtering means, an output means connected to the output filtering means for providing power to an external load, a storage capacitor a first secondary power modulating means connecting the at least a first secondary rectifying means to the storage capacitor a second secondary power modulating means connecting the storage capacitor to the output filtering means and a secondary control means for operating the first and second secondary modulating means in a pulse width modulated mode, such that if a current from the at least a first secondary rectifying means is too great, excess current from the at least a first secondary rectifying means is diverted by the first secondary modulating means for storage as energy in the storage capacitor, and if the current from the at least a first secondary rectifying means is too small, supplemental current will be taken as energy from the storage capacitor to the output filtering means.

8. The AC to DC power converter of claim 7, wherein the first secondary modulation means is a boost converter comprising an inductor, a boost converter switching means and a boost rectifier.

9. The AC to DC power converter of claim 7, wherein the first secondary modulation means is a buck converter comprising a buck converter switching means, a catch rectifier and inductor.

10. The AC to DC power converter of claim 9 further comprising a second secondary winding having a higher voltage output than the at least a first secondary winding, and a second secondary rectifying means connecting the second secondary winding to the first secondary modulating means.

* * * * *